Figure 1:
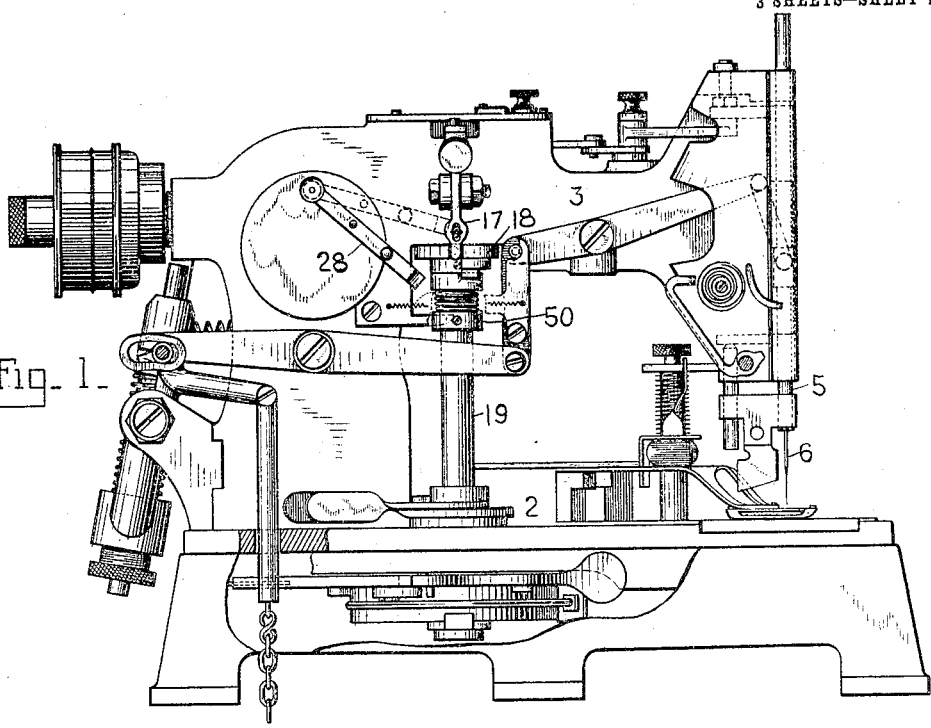

No. 807,531. PATENTED DEC. 19, 1905.
E. B. ALLEN.
BUTTONHOLE STITCHING AND BARRING MACHINE.
APPLICATION FILED NOV. 28, 1904.

3 SHEETS—SHEET 1.

WITNESSES:

INVENTOR
Edward B. Allen,
BY
Henry J. Miller,
his ATTORNEY

No. 807,531. PATENTED DEC. 19, 1905.
E. B. ALLEN.
BUTTONHOLE STITCHING AND BARRING MACHINE.
APPLICATION FILED NOV. 28, 1904.
3 SHEETS—SHEET 2.
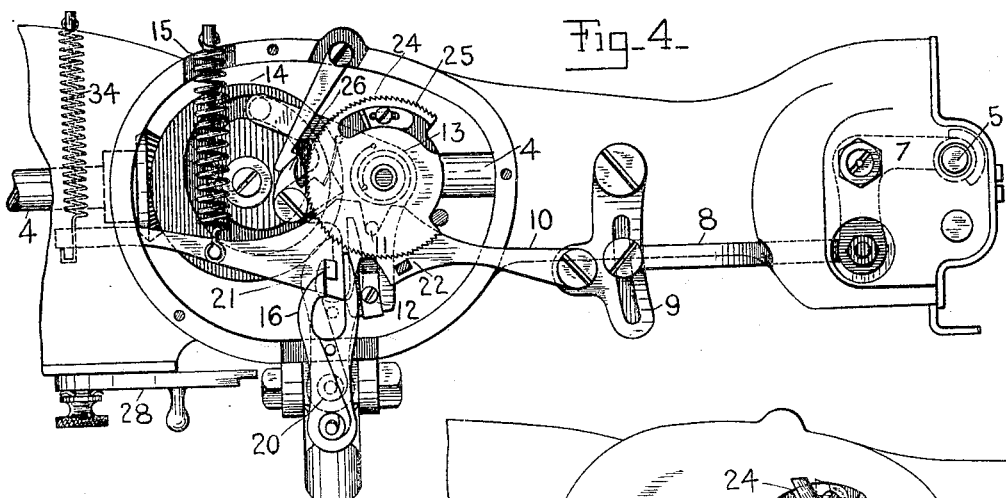
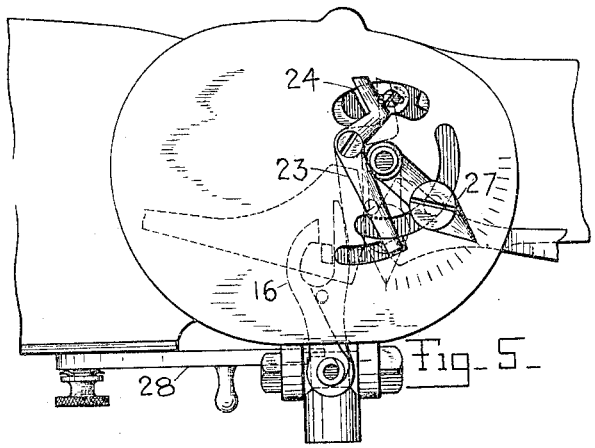
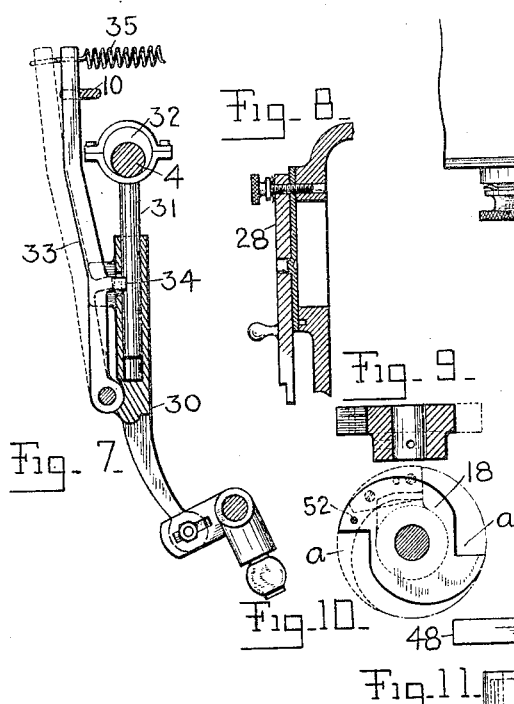
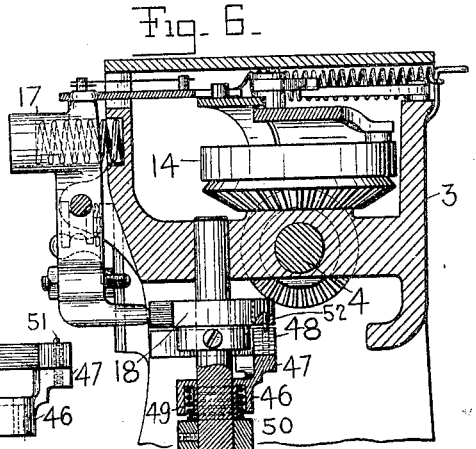
WITNESSES:
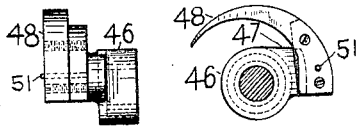
INVENTOR
Edward B. Allen
BY
Henry J Miller
his ATTORNEY No. 807,531.
PATENTED DEC. 19, 1905.
E. B. ALLEN.
BUTTONHOLE STITCHING AND BARRING MACHINE.
APPLICATION FILED NOV. 28, 1904.
3 SHEETS—SHEET 3.
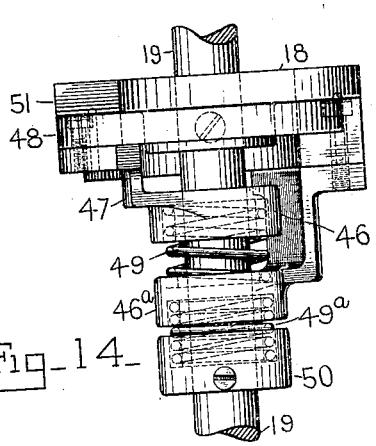
Fig_14_
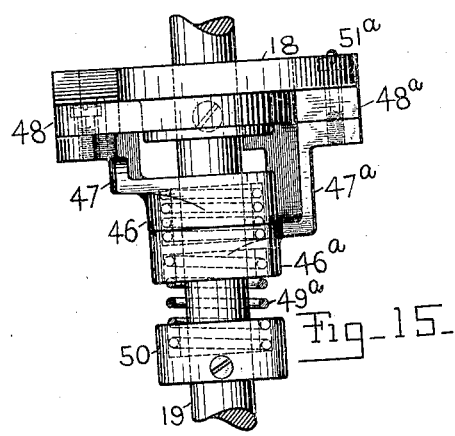
Fig_15_
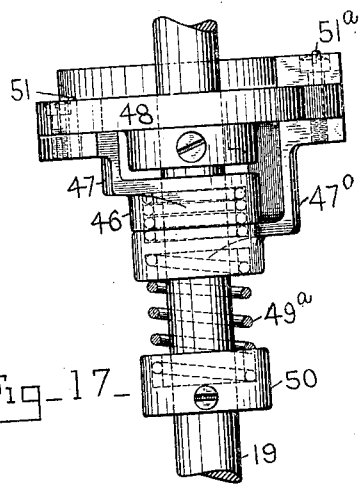
Fig_17_
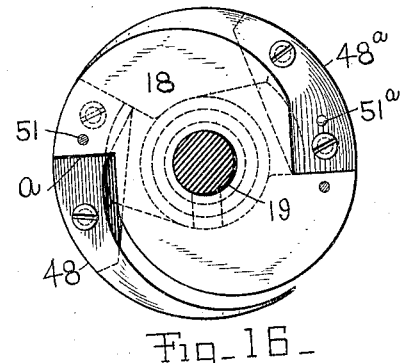
Fig_16_
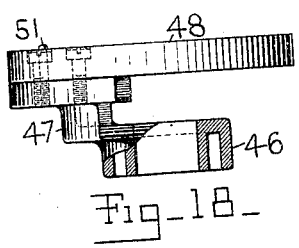
Fig_18_
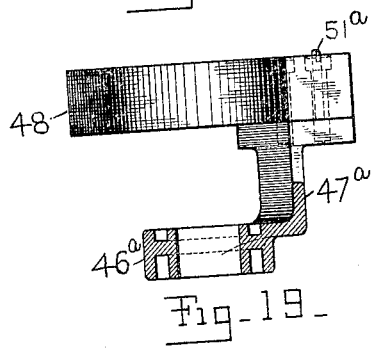
Fig_19_
WITNESSES:
H. A. Kornemann.
W. Ulmer.
INVENTOR
Edward B. Allen,
BY
Harry J. Miller,
his ATTORNEY

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE STITCHING AND BARRING MACHINE.

No. 807,531.     Specification of Letters Patent.     Patented Dec. 19, 1905.

Application filed November 28, 1904. Serial No. 234,445.

*To all whom it may concern:*

Be it known that I, EDWARD B. ALLEN, a citizen of the United States, residing at Elizabeth, in the county of Union and State of New Jersey, have invented certain new and useful Improvements in Buttonhole Stitching and Barring Machines, of which the following is a specification, reference being had therein to the accompanying drawings.

This invention has for its object to increase the scope of that class of buttonhole-machines provided with means whereby the ends of a buttonhole may be barred.

Heretofore in cases wherein different styles of buttonholes were required it has been customary to employ a machine specially fitted for each particular kind of buttonhole, none of which machines were capable of performing the work of another involving a change in its mode of operation.

By the present invention a single machine is rendered not only capable of stitching either barred or unbarred buttonholes, but of producing a bar at either or both ends of the buttonhole, depending upon the character of the buttonhole required.

In the preferable form of this improvement the machine is provided with an adjustable stop device capable of being set in one extreme position in the path of normal movement of a spring-pressed part of the barring mechanism, so as to permit or prevent the effective operation of the barring mechanism, while the usual cam from which is derived the initial action of the barring mechanism is provided with means for changing the character of its operative face to correspondingly alter the action upon the barring mechanism.

In the drawings annexed the present improvement is represented in connection with the buttonhole stitching and barring machine forming the subject of my application, Serial No. 208,366, filed May 17, 1904.

Figure 2:
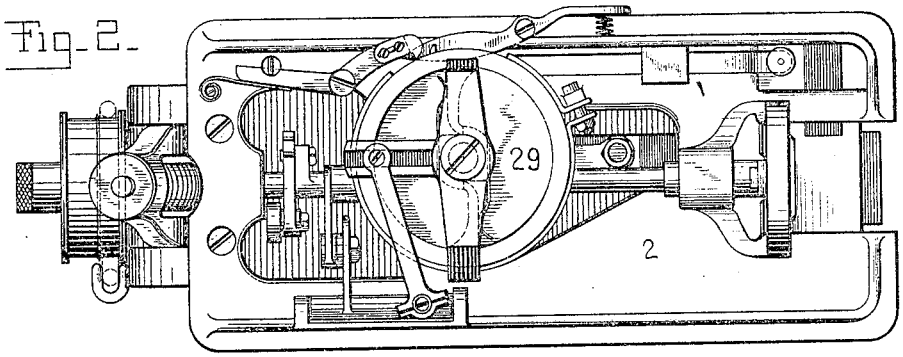

Figure 1 is an elevation of the machine with certain portions broken out to show the construction and arrangement of parts which would be otherwise hidden. Fig. 2 is a plan of the under side of the machine, and Fig. 3 a top view of the feed-cam and its connections with the work-clamp slides. Fig. 4 is a plan, upon a larger scale, of the forward portion of the overhanging arm with the cap-plate of the casing inclosing the timing mechanism of the barring devices removed. Fig. 5 is a partial plan view of the overhanging arm with the cap-plate of the barring-mechanism casing and the parts above the same in position. Fig. 6 is a transverse section through the arm of the machine on the axial line of the feed-shaft. Fig. 7 is a detail view of a portion of the feed-actuating mechanism, and Fig. 8 is a detail sectional view of one of the devices for interrupting the normal automatic action of the barring and feeding mechanisms. Fig. 9 is a sectional elevation, and Fig. 10 a plan, of the bar-timing cam, showing in dotted lines also the relatively movable cam-piece coöperating therewith. Fig. 11 is a side view, Fig. 12 a plan, and Fig. 13 an edge view, of the sliding sleeve and cam-piece coöperating with the timing-cam in controlling the initial action of the barring mechanism. Figs. 14 to 19, inclusive, represent the timing-cam in conjunction with two independent cam-pieces adapted to enter and fill in either or both of its angular cam portions, Figs. 14, 15, and 16 showing said parts in elevation in different relative positions and Fig. 16 showing the same in plan view, while Figs. 18 and 19 represent the cam-pieces and their carrying sleeves detached in partial sectional elevation.

In Figs. 1 to 4, inclusive, the machine is shown adjusted for making barred buttonholes, the operative parts being represented in the positions assumed immediately at the close of the barring operation preparatory to the tripping of the stop-motion device and with the lever 28 (indicated in full lines) as set in its inoperative position, while as represented in Figs. 5 and 6 it is set for making unbarred buttonholes.

As in my application referred to above, the machine is provided with the usual work-plate 2, overhanging arm 3, driving-shaft 4, connected in the usual manner with the needle-bar 5, carrying the needle 6. The needle-bar frame 7 receives its lateral motions through the link 8, vibrating arm 9, and laterally-moving link-bar 10, deriving its movements by alternate engagement of its lateral notches with the pins 11 and 12, carried by the bell-crank member 13, which receives its rocking motions from the rotating cam-wheel 14. The link-bar 10 is normally held in initial side-stitching position with its lateral notch in engagement with the pin 11 by means of the spring 15 and is periodically drawn out of engagement with the pin 11 and into engagement with the pin 12 by means of the pawl-lever 16, carried by one end of the spring-pressed shift-lever 17, whose opposite end is engaged by the double snail-shaped timing-cam 18, fixed upon the feed-cam shaft 19, the pawl-lever 16 being pressed laterally by means of a spring 20, so that when advanced under the vibrating action of the lever 17 it is enabled to snap over the stud 21 upon the link-bar 10 and in its return to outer position draw said link-bar into operative relation with the pin 12, which communicates an increased throw to the needle-bar frame.

After the predetermined number of barring-stitches have been produced the pawl-lever 16 is disengaged from the stud 21 by contact of a downturned finger 22 of one arm of the bent lever 23, whose other arm is engaged by the adjustable stud 24 upon the ratchet-wheel 25, actuated by the pawl 26, which is carried by the bell-crank member 13, whose action thereon commences with the outward shifting of the link-bar 10 to initiate the barring operation.

The effective action of the barring mechanism may be prevented either by shifting the pointer-arm 27 to the left, Fig. 5, to bring its enlarged head into engagement with the bent lever 23, so as to maintain the depending pin carried by the latter in continuous contact with a lateral finger of the pawl-lever 16, and thereby prevent the engagement of the pawl-lever with the stud 21 of the link-bar 10, or the outer notched end of a stop-lever 28 may be thrown under the lower end of the lever 17, constituting a cam-follower, and thereby preventing its continued contact with the operative face of the cam 18.

As described in my application before mentioned, the cycle-feeding mechanism includes a feed-cam 29, operated by means of a suitable clutch mechanism comprising a two-part eccentric-rod, one part 30 of which is formed with a longitudinal socket entered by the shank 31 of the other part, which embraces the actuating-eccentric 32 upon the main shaft 4. The two parts of this eccentric-rod are normally coupled together by means of the lever 33, pivoted upon the member 30 and having a tooth 34 entering a lateral notch in the part 31 and yieldingly maintained therein by means of the spring 35, applied to the upper end of said lever. The engagement of the link-bar 10 with the upper end of the lever 33 in shifting from side-stitching to barring position throws the latter outwardly so as to disengage the part 31 from the part 30 of the eccentric-rod, and thereby interrupt the action of the feed-cam and parts connected therewith. It will be observed that the inaction of the barring mechanism by the means before described permits the continued action of the feeding mechanism throughout the cycle of the machine and results in the production of a buttonhole without the superposed barring-stitches which the machine is designed to produce under normal conditions of its barring mechanism.

Figure 3:
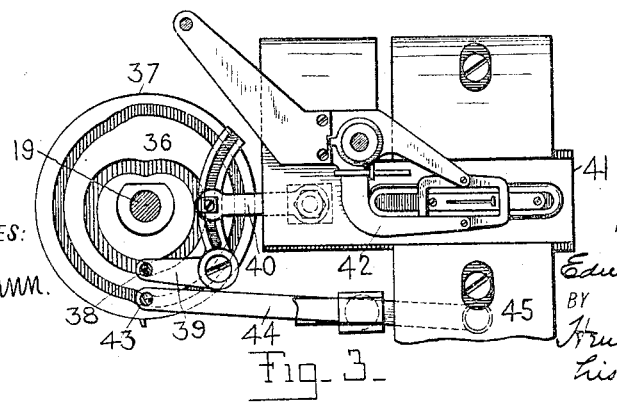

As indicated in Fig. 3, the feed-cam 29 is provided in its upper face with the cam-grooves 36 and 37, the former of which is entered by a pin 38 of a bell-crank lever 39, connected by a link 40 to the longitudinal slide-plate 41, carrying the upper member of the work-clamp 42, while the latter of said grooves is entered by a stud 43 upon one end of the vibrating lever 44, whose opposite end is connected with the transverse slide-plate 45, which carries the slide-plate 41 in a manner well known.

As will be observed from a reference to Figs. 9 and 10, the bar-timing cam 18 is formed with a plurality of angular portions containing the low points $a$, upon which the lower end of the lever 17 is pressed by its spring to enable the upper end of such lever to draw the link-bar 10 outwardly in opposition to its spring 15. In order to prevent the formation of a bar by the coaction of the lever 17 with either of the operative portions of the cam without completely throwing out of action the barring mechanism, as before described, these depressed portions of the cam 18 may be filled in so as to sufficiently limit the corresponding throw of the shift-lever 17 to prevent the engagement of the pawl-lever 16 with its stud 21 of the link-bar 10. To this end a sleeve 46 is fitted loosely to the cam-shaft 19 beneath the timing-cam 18 and provided with an offset arm 47, to which is secured the cam-piece 48, shown herein shaped to substantially fit one of the peripheral depressions of the cam 18, and fill in the same so as to make one-half thereof substantially concentric, and thereby prevent any motion whatever to the shift-lever 17. The sleeve 46 is shown herein provided in its lower side with a counterbore to receive a coil-spring 49, interposed between the inner end of the same and the fixed collar 50 upon the cam-shaft 19, and the upper side of the cam-piece 48 is provided with a slightly-projecting dowel-pin 51, adapted to enter a hole 52 in the under face of the cam 18 when the cam-piece 48 is depressed out of operative relation with the cam 18, as indicated in Fig. 6.

When it is desired to set the cam-piece 48 in such relation with the cam 18 as to prevent the production of a bar at one or the other end of the buttonhole, the sleeve 46 is slightly depressed from its inoperative position to disengage its dowel-pin and turned into the proper circumferential relation with the cam 18 and permitted to rise under the action of the spring 38 to operative position where it is locked in such operative position by the said spring.

It is evidently immaterial whether the sleeve 46 carries one or more cam projections, as this is determined by the nature of the timing-cam 18 and of the changes it is desired to produce in the character of the operative portion of such cam. It is also evident that the employment of the described auxiliary member movable relatively to said cam and adapted for changing the character of its operative portion is not limited to the particular construction and arrangement of parts herein shown, but is adapted to many other conditions involving changes in the character of the work performed by cam-actuated devices of this class of machines.

While the particular form of the primary rotary cam 18 is not an essential part of the present invention, I prefer to construct it as shown and described herein with the offsets for producing the throw of the shift-lever 17 in initiating the change from side-stitching to barring position of the link-bar 10 at the junction of the two sides of operative portions at different distances from its axis of motion.

The means for determining the action of the barring mechanism in the production of the different classes of buttonholes is herein shown as a primary member, which I have termed a "timing-cam," and two relatively movable auxiliary cam-pieces, adapted to be set in such position as to change the character of the primary member. Although the timing-cam is represented as having two shoulders for causing the actuation of the barring mechanism at both ends of a buttonhole, it is evident that in cases where barring is required at one end only of a buttonhole one of the cam-pieces may be permanently secured in operative relation with the timing-cam and may therefore be considered a part of the primary member whose character is capable of being temporarily changed for wholly preventing the barring operation by means of the other auxiliary cam-piece.

By reference to Figs. 14 to 19, inclusive, it will be observed that the initial action of the barring mechanism may be wholly controlled from the cam upon the feed-shaft 19, in which case the stop-lever 28 may be omitted and the adjustment of the pointer-arm 27 may be limited in such manner as to merely control the number of bar-stitches when the machine is otherwise set for producing barred buttonholes. In this form of the improvement the sleeve 46, with lateral arm 47, carrying the complemental cam-piece 48, fitting into one of the peripheral notches of the primary cam 18, is the same as that already described in connection with the preceding figures; but in these figures the thrust-collar 50 is shown in somewhat lower position upon the cam-shaft and a second loose sleeve $46^a$ interposed between the same and the collar 46 and similarly formed with a lateral arm $47^a$, carrying a cam-piece $48^a$, which is similar to the cam-piece 48 excepting that it is of twice its depth. The sleeve 46 is counterbored, as before described, to receive the upper end of the spring 49, which is received in a similar counterbore in the top of the sleeve $46^a$, which has in its lower side also a counterbore to receive the upper end of a coil-spring $49^a$, the lower end of which is received by the collar 50. The operation of the composite cam thus formed is practically the same as that of the two-part cam previously described. When the device is set for the production of buttonholes which are barred at both ends, both cam-pieces 48 and $48^a$ are depressed from operative position and turned slightly to enable their dowel-pins 51 and $51^a$ to enter the corresponding holes in the lower face of the cam 18, in which positions they are retained by the action of the springs 49 and $49^a$, as represented in Fig. 14. When it is desired to prevent the barring of one end of a buttonhole, the cam $48^a$ is shifted into the position represented in elevation and plan views in Figs. 15 and 16, the upper portion of the cam-piece $48^a$ entering the peripheral recess in the cam 18, while the cam-piece 48 remains in its inoperative position beneath the operative portion of the cam 18. The cam-piece $48^a$ is retained in this position by the engagement of its carrying-sleeve $46^a$ with the lower end of the sleeve 46. To prevent the formation of a bar at either end of the buttonhole, the cam-piece 48 is slightly shifted circumferentially to bring it into register with the other peripheral recess of the cam 18, when both cam-pieces 48 and $48^a$ are enabled to rise under the action of their springs, so as to fill both peripheral recesses of the primary cam 18, Fig. 17, the cam-piece $48^a$ in such operation merely rising another step without changing the action upon the lever 17, which it produced in the operative position previously described.

It is evident that by suitable manipulation of the cam parts 48 and $48^a$ any of the four forms of buttonholes heretofore described— viz., those having no bar, a bar only at the first end, a bar only at the second end, or bars at both ends—may be readily produced, and that this may be as easily effected in connection with the mechanism forming the subject of my prior patent, No. 738,591, dated September 8, 1903, or other forms of machines of this general type as in that specifically shown and described herein.

From the foregoing description it will be seen that the particular form and constructive features of the means for converting a buttonhole-machine for production of the different classes of buttonholes above described are not essential parts of the present invention, nor is the particular type of machine in which it is embodied, provided the same comprises suitable stitch-forming mechanism, jog-producing mechanism for communicating relative lateral or overseaming movements between the stitch-forming mechanism and the work, and cycle-feeding mechanism for producing relative feeding movements between the stitch-forming mechanism and the work to space the overseaming-stitches, whereby a barless buttonhole may be produced when all such mechanisms remain in the same relation throughout the cycle of operation of the machine, together with a controller for one or more of said mechanisms whereby the character of the stitching at the ends of the buttonhole may be changed either by effecting the lengthening and subsequent shortening of the relative jogging movements of the needle and the work or by retarding or wholly stopping the relative feed of the stitch-forming mechanism and the work, or both.

Having thus set forth the nature of my invention, what I claim herein is—

1. In a buttonhole-stitching machine, the combination with stitch-forming, jog-producing and cycle-feeding mechanisms whereby a buttonhole having parallel lines of overseam side stitches connected at the ends by cross-stitches may be produced, of normally operative barring mechanism whereby the character of the stitching may be changed at an end of the buttonhole to produce a bar, and controlling means whereby said barring mechanism may be rendered inoperative at one end of the barred buttonhole without affecting its condition at the opposite end of the same.

2. In a buttonhole-stitching machine, the combination with stitch-forming, jog-producing and cycle-feeding mechanisms whereby a buttonhole having parallel lines of overseam side stitches connected at the ends by cross-stitches may be produced, of normally operative barring mechanism including a member operative twice in the cycle of operation of the machine, whereby the character of the stitching may be changed at both ends of the buttonhole to produce bars, and controlling means whereby said operative member of the barring mechanism may be rendered inoperative at one end of the buttonhole while remaining operative at the opposite end of the same.

3. In a buttonhole-stitching machine, the combination with stitch-forming, jog-producing and cycle-feeding mechanisms whereby a buttonhole having parallel lines of overseam side stitches connected at the ends by cross-stitches may be produced, of normally operative barring mechanism including a member operative twice in the cycle of operation of the machine, whereby the character of the stitching may be changed at both ends of the buttonhole to produce bars, and controlling means operative in conjunction with said member of the barring mechanism and movable into different operative relations therewith to render it inoperative at will at either end of the buttonhole without affecting its operation at the opposite end.

4. In a buttonhole-stitching machine, the combination with stitch-forming, jog-producing and cycle-feeding mechanisms whereby a buttonhole having parallel lines of overseam side stitches connected at the ends by cross-stitches may be produced, of normally operative barring mechanism including a member operative twice in the cycle of operation of the machine, whereby the character of the stitching may be changed at both ends of the buttonhole to produce bars, and controlling means for said member of the barring mechanism comprising two separate parts each of which is adapted for simultaneous operation in conjunction with a different operative part of said member and one of which is also adapted for operation singly in conjunction with one of the operative parts of said member, whereby said barring mechanism may be rendered inoperative at one or both ends of the buttonhole.

5. In a buttonhole stitching and barring machine, the combination with stitch-forming mechanism and means for producing relative feeding movements between the stitch-forming mechanism and the work, of barring mechanism comprising a cam and an engaging part for initiating the change from side stitching to barring relation of the coacting parts of the barring mechanism, and means whereby the character of the operative portion of said cam may be altered to vary its effect upon the engaging part of said barring mechanism.

6. In a buttonhole stitching and barring machine, the combination with stitch-forming mechanism and means for producing relative feeding movements between the stitch-forming mechanism and the work, of barring mechanism comprising a primary rotary cam formed with a shouldered operative portion, devices including a follower engaging and controlled by said cam in initiating the change from side stitching to barring relation of the coacting parts of the barring mechanism, and an auxiliary cam-piece adapted to cover said operative portion of the primary cam.

7. In a buttonhole stitching and barring machine, the combination with stitch-forming mechanism and means for producing relative feeding movements between the stitch-forming mechanism and the work, of barring mechanism comprising a rotary cam-shaft, a primary cam mounted thereon, devices including a follower engaging and controlled by said cam for initiating the change from side stitching to barring relation of the coacting parts of the barring mechanism, and a sleeve adapted to slide longitudinally of said cam-shaft and provided with a cam-piece adapted to overlie the operative portion of said primary cam to alter its character and thereby vary its effect upon the said follower.

8. In a buttonhole-stitching machine, the combination with stitch-forming, cycle-feeding, jog-producing and barring mechanisms, of a primary cam for controlling the action of said barring mechanism, a follower therefor, and an auxiliary cam-piece movable axially in relation to said primary cam and adapted to be shifted into and out of operative relation with said follower to change the movement of the same derived from said primary cam.

9. In a buttonhole stitching and barring machine, the combination with stitch-forming, feeding and barring mechanisms, of a cam having a peripheral shouldered portion and forming an operative member of one of said mechanisms and a follower therefor, and a cam-piece fitted to the shouldered portion of said cam and adapted to be shifted to and from the same respectively into operative and inoperative relation with said follower for producing variations in the effect of said cam upon its follower.

10. In a buttonhole stitching and barring machine, the combination with stitch-forming mechanism and means for producing relative feeding movements between the stitch-forming mechanism and the work comprising a feed-cam and a shaft upon which the same is mounted, of barring mechanism comprising a primary cam mounted upon the feed-shaft and provided with an angular operative portion, a follower therefor, a cam-piece fitted to said angular portion of said primary cam and adapted to be shifted axially thereof to and from the same respectively into and out of operative relation with said follower, and means whereby said cam-piece may be maintained in position in said relations.

11. In a buttonhole stitching and barring machine, the combination with stitch-forming mechanism and means for producing relative feeding movements between the stitch-forming mechanism and the work comprising a feed-cam and a shaft upon which the same is mounted, of barring mechanism comprising a primary cam mounted upon the feed-shaft and provided with an angular operative portion, a follower therefor, a cam-piece fitted to an operative portion of said primary cam and mounted to freely slide and rotate upon said shaft, a spring for pressing said cam-piece toward said cam, and means for locking said cam-piece from rotation when in inoperative position.

12. In a buttonhole stitching and barring machine, the combination with stitch-forming mechanism and means for producing relative feeding movements between the stitch-forming mechanism and the work comprising a feed-cam and a shaft upon which the same is mounted, of barring mechanism comprising a primary cam mounted upon the feed-shaft and provided with a plurality of angular portions, a follower therefor, and a plurality of cam-pieces mounted revolubly and slidably upon said shaft and each fitted to an angular portion of said primary cam and adapted to be shifted axially thereof to and from the same respectively into and out of operative relation with said follower.

In testimony whereof I have signed my name to this specification in the presence of two subscribing witnesses.

EDWARD B. ALLEN.

Witnesses:
 ALFRED C. DARLING,
 HENRY J. MILLER.